United States Patent
Van Riel

(10) Patent No.: US 8,683,342 B2
(45) Date of Patent: Mar. 25, 2014

(54) AUTOMATIC SELECTION OF ONLINE CONTENT FOR SHARING

(75) Inventor: Henri Han Van Riel, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 967 days.

(21) Appl. No.: 11/680,578

(22) Filed: Feb. 28, 2007

(65) Prior Publication Data

US 2008/0208969 A1 Aug. 28, 2008

(51) Int. Cl.
*G06F 3/00* (2006.01)

(52) U.S. Cl.
USPC .................... 715/733; 715/229; 707/695

(58) Field of Classification Search
USPC ........................................ 707/1, 3
See application file for complete search history.

(56) References Cited

U.S. PATENT DOCUMENTS

| | | | |
|---|---|---|---|
| 5,434,994 A | 7/1995 | Shaheen et al. | |
| 5,926,816 A * | 7/1999 | Bauer et al. | 707/8 |
| 6,212,529 B1 * | 4/2001 | Boothby et al. | 707/201 |
| 6,845,390 B1 * | 1/2005 | Jorgenson et al. | 709/205 |
| 6,976,093 B2 | 12/2005 | Lara et al. | |
| 2002/0087599 A1 * | 7/2002 | Grant et al. | 707/513 |
| 2004/0054661 A1 * | 3/2004 | Cheung et al. | 707/3 |
| 2004/0098412 A1 * | 5/2004 | Raspl | 707/104.1 |
| 2004/0177343 A1 | 9/2004 | McVoy et al. | |
| 2004/0255233 A1 * | 12/2004 | Croney et al. | 715/500 |
| 2005/0086384 A1 | 4/2005 | Ernst | |
| 2005/0210012 A1 * | 9/2005 | Ding et al. | 707/3 |
| 2006/0222163 A1 * | 10/2006 | Bank et al. | 379/221.08 |
| 2007/0233582 A1 * | 10/2007 | Abhyanker | 705/28 |
| 2007/0244906 A1 | 10/2007 | Colton et al. | |
| 2008/0052407 A1 * | 2/2008 | Baudino et al. | 709/238 |
| 2008/0059539 A1 | 3/2008 | Chin | |
| 2008/0126944 A1 * | 5/2008 | Curtis et al. | 715/733 |
| 2008/0154908 A1 | 6/2008 | Datar | |
| 2008/0209327 A1 * | 8/2008 | Drucker et al. | 715/733 |
| 2008/0270915 A1 | 10/2008 | Tevanian | |
| 2009/0037523 A1 | 2/2009 | Kolke et al. | |
| 2009/0327358 A1 | 12/2009 | Lukiyanov | |

OTHER PUBLICATIONS

"Automated Tag Clustering: Improved Search and Exploration in the Tag Space" by Begelman et al, In: Proc. of Collaborative Web Tagging Workshop at WWW2006, May 22-26, 2006, 5 pages. Available at http://www.pui.ch/phred/automated_tag_clustering/automated_tag_clustering.pdf.*

"ATPM 10.11—How to Share Content between Web Sites," by Andrew Kator (2004). Available at: http://www.atpm.com/10.11/howto.shtml Last visited: Jan. 1, 2010 (screenshots provided).*

(Continued)

*Primary Examiner* — Daniel Kinsaul
(74) *Attorney, Agent, or Firm* — Lowenstein Sandler LLP

(57) ABSTRACT

Embodiments of the present invention provide a way to combing websites that can be edited over the Internet using distributed revision control. This also makes it possible to use writable web sites while not being connected to the Internet. In some embodiments, the present invention is applied to wikis. When a wiki reconnects, differences are automatically sent over and changes from other wikis are merged automatically. Wikis may also be synchronized on a periodic or event driven basis. Embodiments of the present invention may also be used for load balancing between wikis, or to share information with users who can only occasionally connect to the Internet.

20 Claims, 5 Drawing Sheets

(56) References Cited

OTHER PUBLICATIONS

Towards a Wiki Interchange Format, by Volkel and Oren. (2006). Available at: http://citeseerx.ist.psu.edu/viewdoc/download?doi=10.1.1.61.5703&rep=rep1&type=pdf Last visited: Jan. 1, 2010.*

"Towards Semantically-Interlinked Online Communities," by Breslin et al In: Lecture Notes in Computer Science vol. 3532/2005, pp. 500-514 (May 18, 2005). Available at: SpringerLink.*

"A Collaborative Methodology for the Rapid Development and Delivery of Online Courses," by Talbott et al. In: SIGDOC 02 (2002). Available at: ACM.*

"Experience Using the Web-Based Tool Wiki for Architecture Documentation," by Bachmann and Merson. In: Technical Report CMU/SEI-2005-TN-041, Carnegie Mellon University, Software Engineering Institute, 2005. Available at: http://repository.cmu.edu/sei/436/.*

"Intranet Wikis," by Buffa, Michel. In: Proc. Intranet Workshop, 15th (2006). Available at: http://www-sop.inria.fr/acacia/WORKSHOPS/IntraWebs2006/Buffa_Intrawebs2006.pdf.*

"Towards a Semantic Wiki Wiki Web," by Tazzoli et al. In: 3rd International Semantic Web Conference (ISWC2004), Hiroshima, Japan, 2004. Available at: http://iswc2004.semanticweb.org/posters/PID-LPSVVIIZ-1090243438.pdf.*

"IkeWiki: A Semantic Wiki for Collaborative Knowledge Management," by Schaffert, Sebastian. In: Proc. 15th IEEE Int'l Workshop on Enabling Technologies: Infrastructure for Collaborative Enterprises (2006). Available at: IEEE.*

"Wikis for Supporting Distributed Collaborative Writing," by Wei et al. In: Proc. Society Technical Communication, 52nd Annual Conference (2005). Available at: http://depts.washington.edu/ibuxl/docs/STC_Wiki_2005_STC_Attribution.pdf.* van Riel, U.S. Appl. No. 11/680,573, filed Feb. 28, 2007.

TheFreeDictionary.com, Collaborative software, http://encyclopedia2.thefreedictionary.com/Online+collaboration.

Red Hat Advisory Action for U.S. Appl. No. 11/680,573 mailed Jan. 28, 2010.

Red Hat Advisory Action for U.S. Appl. No. 11/680,573 mailed Jan. 11, 2011.

Red Hat Office Action for U.S. Appl. No. 11/680,573 mailed Jul. 12, 2011.

Red Hat Final Office Action for U.S. Appl. No. 11/680,573 mailed Oct. 28, 2010.

Red Hat Final Office Action for U.S. Appl. No. 11/680,573 mailed Nov. 10, 2009.

Red Hat Office Action for U.S. Appl. No. 11/680,573 mailed May 13, 2009.

Red Hat Office Action for U.S. Appl. No. 11/680,573 mailed Jun. 7, 2010.

* cited by examiner

_US 8,683,342 B2_

AUTOMATIC SELECTION OF ONLINE CONTENT FOR SHARING

FIELD OF THE INVENTION

The present invention relates to online collaboration, and more particularly, it relates to a distributed wiki.

BACKGROUND OF THE INVENTION

A Wiki is a piece of server software that allows users to freely create and edit Web page content using any Web browser. Wiki supports hyperlinks and employs a simple text syntax for creating new pages and crosslinks between internal pages on the fly. Of note, a Wiki allows the organization of contributions to be edited in addition to the content itself, otherwise known as "open editing." This allows everyday users to create and edit any page in a Web site, encourages democratic use of the Web, and promotes content composition by non-technical users. Wikis are popular due to their simplistic approach. The time needed to learn how to use a wiki is less than most typical content management systems or HTML editors.

Today, hundreds of different wiki engines exist. However, these wild engines all have a different syntax and different user interfaces. Thus, current Wiki engines are mostly monolithic applications.

Unfortunately, this results in different wikis being unable to share content with each other. This effectively limits the breadth of information that can be encompassed by any one wiki. In addition, it results in various wikis being repetitive of each other.

Accordingly, it may be desirable to provide methods and systems that allow for wikis to be distributed and to be able share content. It may also be desirable to provide methods and systems for sharing content with wikis or other types of websites that have slow or intermittent network connectivity.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide a way to combining content on web sites that can be edited over the Internet using distributed revision control. This also makes it possible to use writable web sites while not being connected to the Internet. In some embodiments, the present invention may be applied to wikis. In particular, when a wiki reconnects, differences are automatically sent over and changes from other wikis are merged automatically. Wilds may also be synchronized on a periodic or event driven basis. Embodiments of the present invention may also be used for load balancing between wikis, or to share information with users who can only occasionally connect to the Internet.

In some embodiments, conflicting changes at various wikis are permitted to persist in merged versions. This permits users to become aware of the edits and input from across the entire wiki-base. Conflicting changes may eventually be resolved manually, for example, by an editor at one of the wikis. Upon receiving such a version, the embodiments of the present invention utilize that version as the reference point for tracking future changes.

The content shared between wikis may be specified in various ways. For example, one wiki may provide the other a set of tags indicating content that is desired for sharing. These tags may relate to various subjects or themes of content at a wiki.

Reference will now be made in detail to the exemplary embodiments of the invention, which are illustrated in the accompanying drawings. Wherever possible, the same reference numbers will be used throughout the drawings to refer to the same or like parts.

Figure 1:
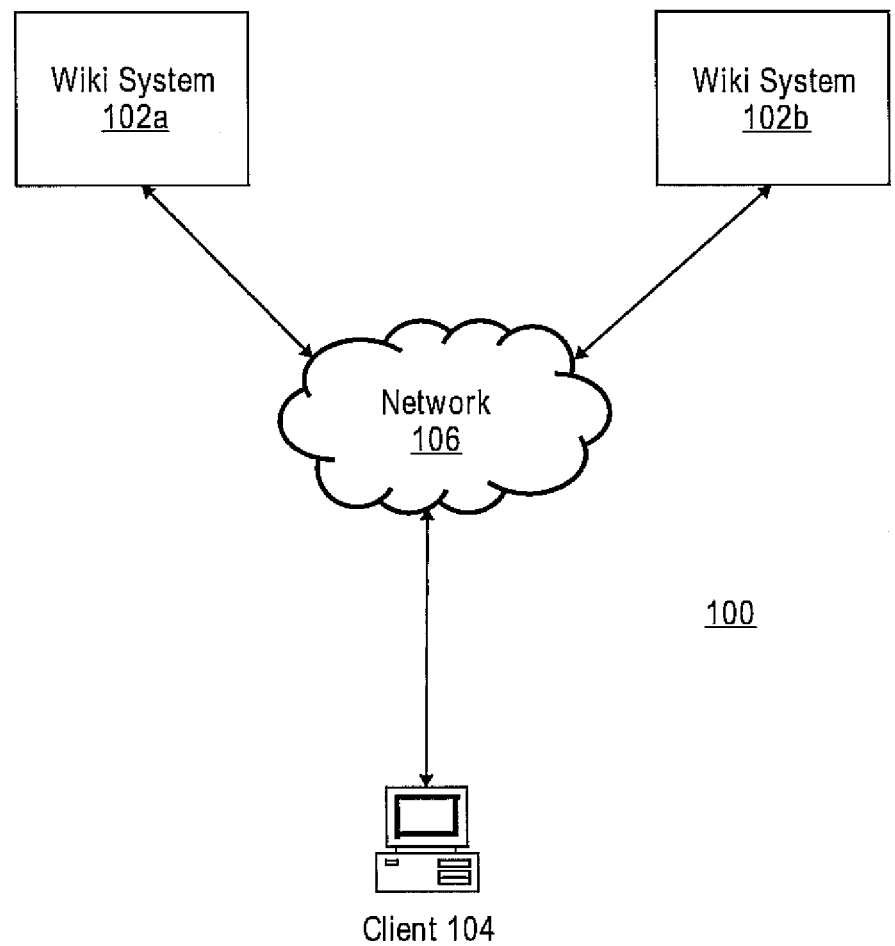
FIG. 1 illustrates an exemplary distributed wiki system that is consistent with the principles of the present invention.

FIG. 1 illustrates an exemplary distributed wiki system 100 that is consistent with the principles of the present invention. As shown, system 100 may comprise a plurality of wiki systems 102*a-b* and one or more clients 104 that are coupled together via a network 106.

Wiki systems 102*a-b* may represent websites in which content is contributed and may be edited. Wiki systems 102*a-b* may comprise the hardware and software for providing a wiki. Wiki systems 102*a-b* may be implemented using well known components of hardware, such as a general purpose server having one or more processors, a memory, storage, etc.

Wiki systems 102*a-b* also may comprise well known collaborative software that runs the Wiki. This software typically allows web pages to be created and edited using a web browser. Wiki software may be implemented as a server side script that runs on one or more web servers, with the content generally stored in a relational database. Wiki systems 102*a-b* are further described with reference to FIG. 2.

Clients 104 provide a user interface for system 100. Clients 104 may be implemented using a variety of devices and software. For example, clients 104 may be implemented on a personal computer, workstation, or terminal. In addition, clients 104 may run under an operating system, such as the LINUX operating system, the Microsoft™ Windows operating system, and the like. Clients 104 may also operate through an Internet browser application, such as Firefox by Mozilla, Internet Explorer by Microsoft Corporation, or Netscape Navigator by Netscape Communications Corporation.

One skilled in the art will also recognize that clients 104 may be implemented with various peripheral devices, such as a display, one or more speakers, and other suitable devices that are capable of providing feedback information to a user. Clients 104 may also be implemented with various peripherals for accepting input from a user, such as a keyboard, a mouse, and the like. Although FIG. 1 shows a single client, system 100 may include any number of clients.

Network 106 serves as a communications infrastructure for system 100. Network 106 may comprise one or more networks, such as a local area network, or wide area network. In addition, network 106 may support a wide variety of known protocols, such as the transport control protocol and Internet protocol ("TCP/IP") and hypertext transport protocol ("HTTP").

Figure 2:
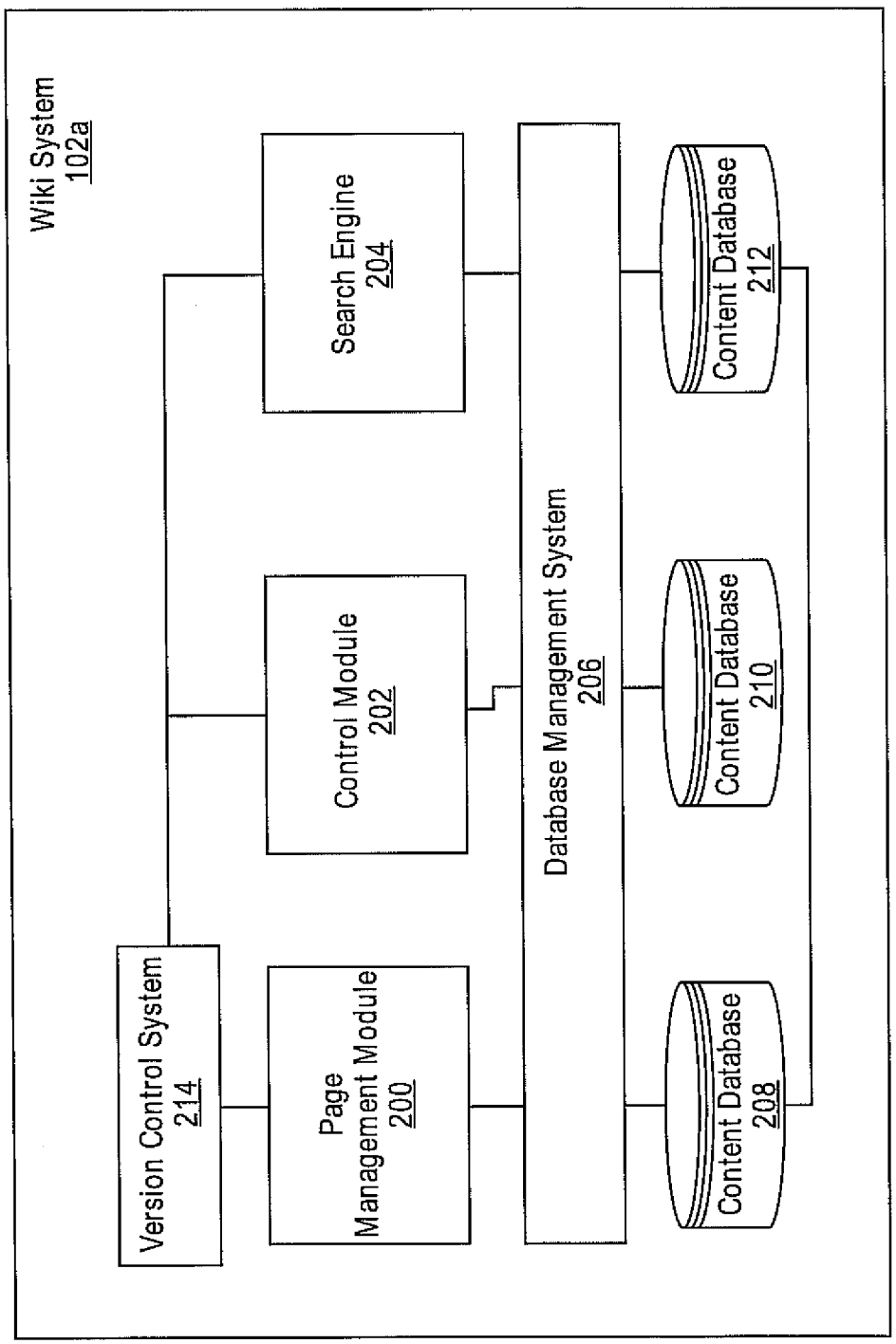
FIG. 2 illustrates an exemplary architecture of a distributed wiki that is consistent with the principles of the present invention.

FIG. 2 illustrates an exemplary architecture of a distributed wiki system that is consistent with the principles of the present invention. As shown, wiki system 102a (or 102b) may comprise a page management module 200, a control module 202, a search engine 204, a database management system 206, a page database 208, a control database 210, a search index 212, and a version control system 214.

Page management module 200 manages the content of wiki system 102a. For example, page management module 200 manages the creation, read and modification of pages by users of wiki system 102a.

Control module 202 manages certain administrative functions of wiki system 102a. For example, control module 202 may control user accounts and authentication, tracking user histories of pages visited, user/IP address blocking, and providing various special pages, such as database logs, server histories, etc.

Search engine 204 allows users to search the content of wiki system 102a. For example, a user may enter various key words and, in response, search engine 204 may provide a listing of pages in wiki system 102a that contain the entered key words.

Database management system 206 manages the access and modification of information stored in the databases of wiki system 102. Database management 206 may be implemented as a relational database system. Such systems are well known.

Page database 208 serves as the repository for the content pages of wiki system 102. Control database 210 contains the administrative information of wiki system 102, such as user accounts, user histories, etc. Search index 212 is a search index data structure to assist search engine 204.

Version control system 214 controls and synchronizes the content contained in wiki systems 102a-b. Version control system 214 is configured to allow multiple simultaneous editing of pages on any of wild systems 102a-b. In some embodiments, version control system 214 does not enforce a change conflict resolution and instead allows for conflicting changes to persist. In order to indicate conflicting changes, wiki systems 102a-b may instead employ a markup display or dual display that highlights the conflicting changes.

All changes are distributed by merging (pushing/pulling) between wiki systems 102a-b. This allows wiki systems 102a-b to collaborate with each other even one is temporarily without a network connection to network 106. Furthermore, version control system 214 also allows wiki systems 102a-b fall revision control capabilities without requiring permissions to be granted by a central authority.

The sharing relationships between wiki systems 102a-b may be in different forms. One wiki may fully share all of its content with another wiki. Alternatively, a wiki may share only portions of its content with other wikis. Furthermore, wilds may merge changes from other wikis with different priorities. For example, one wiki may automatically accept any changes provided from another wiki. However, in other cases, a wiki may accept only selected changes provided from another wiki. This feature allows wikis to establish different levels of sharing and editing authority with each other while sharing content.

In some embodiments, version control system 214 employs delta encoding to store and transmit changes between wiki systems 102a-b. In delta encoding, changes are encoded in the form of differences between sequential data rather than complete files. Version control system 214 may be configured to push/pull changes and merge with other wikis on a periodic or event driven basis. For example, version control system 214 may be configured to automatically synchronize with other wikis on a daily or hourly basis. In addition, version control system 214 may be configured to automatically synchronize with other wikis upon establishing or reestablishing a connection to network 106.

Wiki systems 102a-b may select or filter the content that is shared between them. For example, an administrator at wiki system 102a may provide or select various themes or categories of content that are interest at wiki system 102b. Wiki systems 102a-b may filter content to determine content that is desired or may filter content and remove content that is undesired. The filtering process may also be performed either at wiki systems 102a or 102b, alone or in combination with each other.

In some embodiments, the administrator may specify various tags that indicate the desired content to be shared by wiki system 102a with wiki system 102b. Wiki systems 102a-b may query based on tags using a uniform resource identifier (URI) handler and a syntax, such as tag:<tag>. Tags are commonly used in wikis to organize and categorize their content. Wiki content may comprise multiple tags to indicate various contexts of the content. Using tags, wiki systems 102a and 102b can search and identify the content categorized under a tag or a collection of tags. Tags in wiki systems 102a-b may be predefined, e.g., by an administrator, or may be automatically created as content posted in the wikis.

Wiki systems 102a and 102b may select relevant content based on the tagging used in the content. For example, the relevance of a particular piece content may be measured by the fraction of users that tag the particular piece content to a category. In addition, relevance may consider a relative fraction of tagging. For example, web page articles having been tagged with "sports" as category may require a higher fraction to be considered relevant versus articles on obscure topics, such as "particle physics." This algorithm may be useful to overcome mistagging as well as to account for the commonality or obscurity of a desired content. This algorithm may also be useful in filtering for desired content. For example, wiki systems 102a-b may restrict themselves to sharing content that only have relatively high relevance to a desired category above a given threshold.

In some embodiments, wiki systems 102a-b may calculate various statistics related to how content is tagged. For example, wiki systems 102a-b may calculate various percentile distributions of how often a piece of content was categorized in a given category. Other statistics, such as mean, median, standard deviation, etc., may also be calculated. Accordingly, wiki systems 102a-b may utilize well known statistical techniques to identify content that is relevant to a desired category.

In addition, wiki systems 102a-b may be configured to search for content using their respective indexing schemes. For example, some wikis provide an index or categories listing to assist in organizing the content. One well known scheme is the categories listing used by WikiMedia Foundation, Inc. Of note, wiki systems 102a-b may be configured to accommodate different implementations of wiki tagging. This allows wiki systems 102a-b to implement their own naming conventions, syntax, etc., yet still be able to share content with each other.

Figure 3:
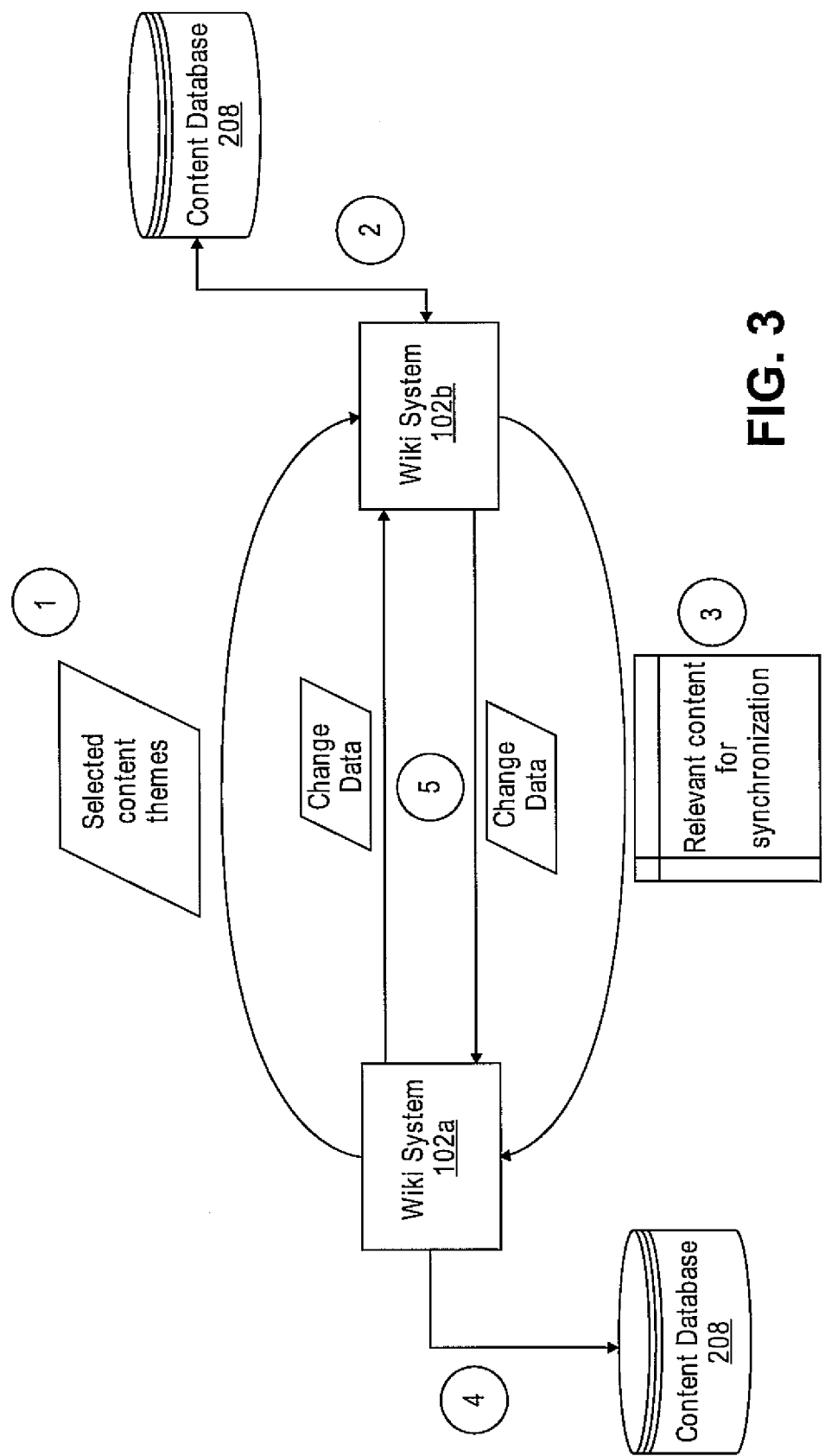
FIG. 3 illustrates a general process for distributed wikis to share content in accordance with the principles of the present invention.
Figure 4:
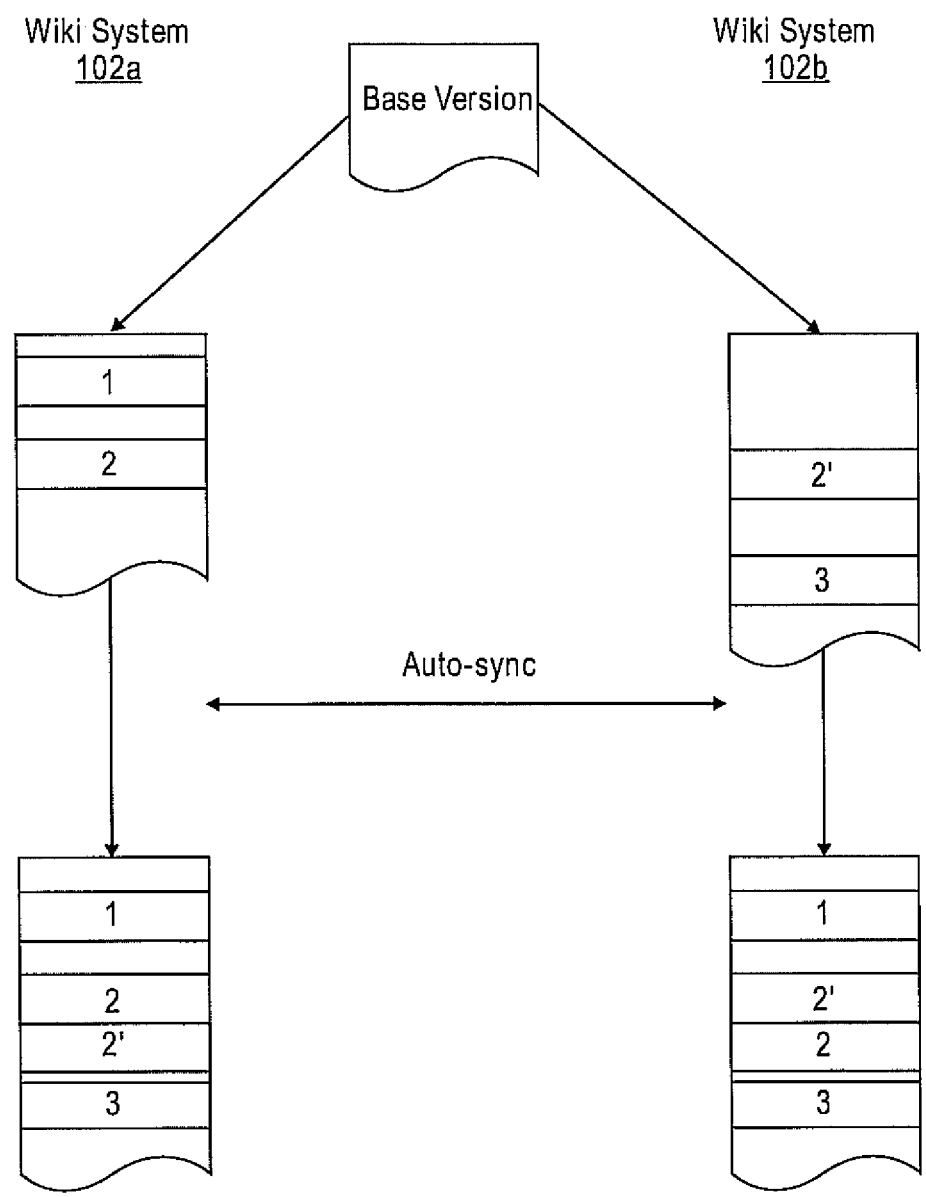
FIG. 4 illustrates an exemplary lifecycle of a page of content in the distributed wikis.
Figure 5:
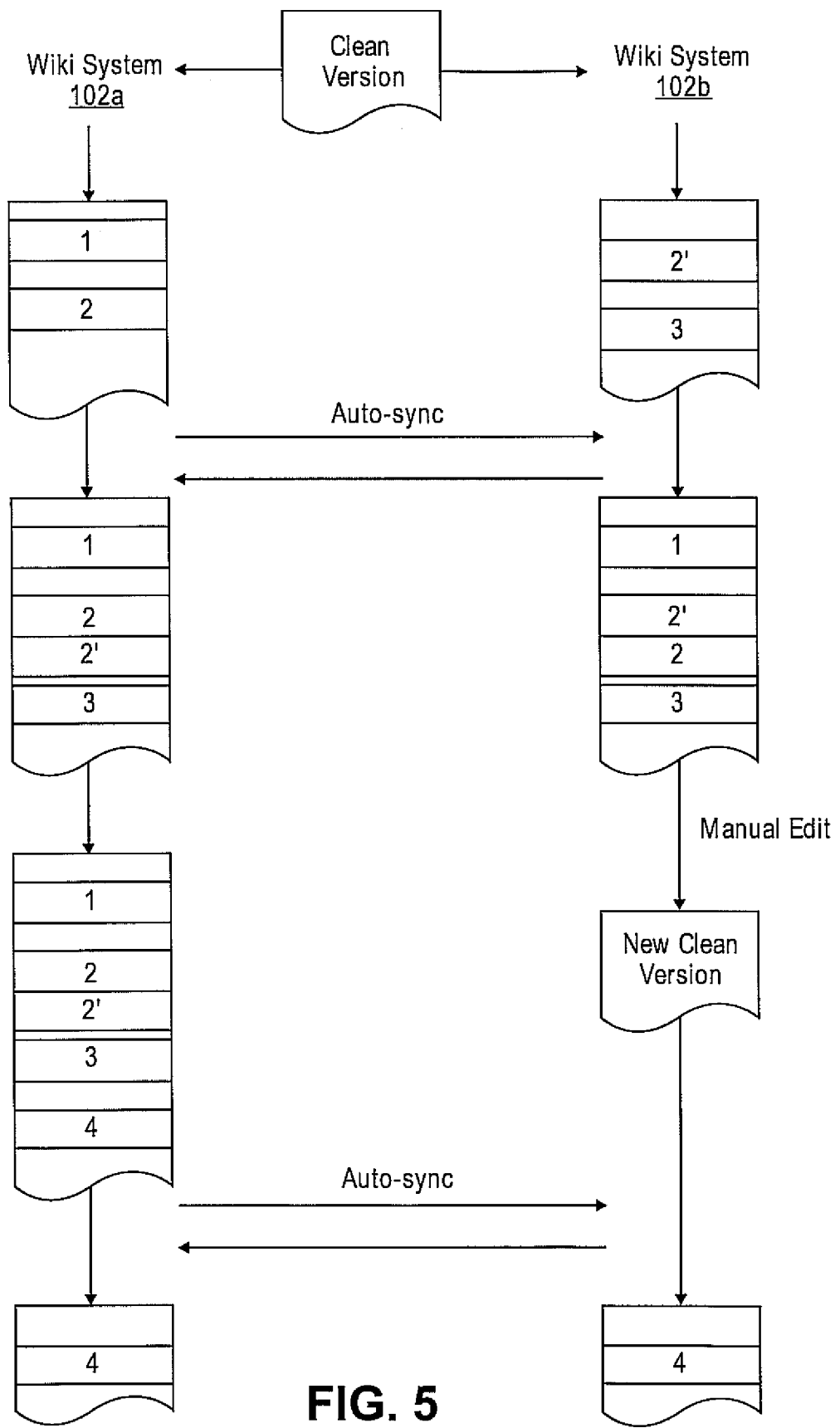
FIG. 5 illustrates another exemplary lifecycle of a page of content in the distributed wikis.

In order to illustrate how wiki systems 102a-b can share content, FIGS. 3-5 are provided. FIG. 3 illustrates a general process for distributed wikis to share content in accordance with the principles of the present invention. FIG. 4 illustrates an exemplary lifecycle of a page of content in the distributed wikis. FIG. 5 illustrates another exemplary lifecycle of a page of content in the distributed wikis. These figures will now be briefly described.

Referring now to FIG. 3, an exemplary process by wiki systems 102a-b for sharing content is provided. For purposes of illustration, FIG. 3 provides as an example wiki system 102a sharing selected content from wiki system 102. In order to establish this form of sharing, wiki system 102a may first provide selected content themes, categories, or tags that indicate the desired content to be shared. For example, wiki system 102a may provide a set of tags or categories to wiki system 102b.

In response, wiki system 102b may receive this information and search its content database 208 for relevant content. For example, the tags from wiki system 102a may be passed to search engine 204. Search engine 204 may then search its search index 212 based on the provided tags and locate the content in content database 208.

In addition, wiki system 102b may perform other related tasks. For example, wiki system 102b may authenticate that wiki system 102a is approved for sharing content. This processing may be performed by control module 202 and queries to control database 210.

Next, wiki system 102b may provide the selected content to wiki system 102a. In order to preserve network bandwidth or processing resources, wiki system 102b may perform this upload to wiki system 102a in portions, or at less busy times of the day. Wild system 102b may also be configured to upload its shared content on a periodic basis, for example, as requested by an administrator. Alternatively, wiki system 102b may simply provide links to the shared content, which are accessible from wiki system 102a.

Wiki system 102a stores the shared content to its content database 208, and thus, allows its users to view and edit the content. Accordingly, users of wiki system 102a now have the benefit of shared content from wiki system 102b.

Finally, wiki systems 102a-b may exchange changes to their shared content with each other. For example, as noted above, the version control systems 214 of systems 102a-b may exchange delta encoded changes with each other to indicate changes in shared content. FIG. 3 illustrates a fully symmetric sharing relationship between wiki systems 102a and 102b. However, one skilled in the art will recognize that wiki systems 102a and 102b may exchange changes in an asymmetric fashion.

For example, wiki system 102a may be system that only intermittently has network access. Thus, changes submitted to wiki system 102a may be exchanged with wiki system 102b with higher priority to take advantage of a current network access of wiki system 102a. Alternatively, wiki system 102a may be a site where content is primarily viewed, but not edited. Hence, changes from wiki system 102b to 102a may be given more priority. Other variations in exchanging content changes are also within the principles of the present invention.

FIG. 4 illustrates an exemplary lifecycle of content that is shared between wiki systems 102a-b. As shown, it is assumed that wiki systems 102a-b start with a clean (or base) version of the content. A clean or base version may be any version of the content which is used as reference point for identifying changes. Over time, either of wiki systems 102a or 102b receives edits to the content. These changes may come from a variety of source, such as the users of either wiki systems 102a or 102b. In addition, some of these changes may or may not conflict with each other.

For example, as shown at wiki system 102a, changes 1 and 2 have been received. Meanwhile, at wiki system 102b, changes 2' and 3 have been received. In this example, changes 1 and 3 are non-conflicting changes, i.e., changes to different sections of text. However, changes 2 and 2' are conflicting, i.e., changes to the same section of text.

In particular, as shown, wiki systems 102a and 102b perform an automated synchronization with each other. During this synchronization, version control systems 214 at wiki systems 102a and 102b attempt to merge the changes together. However, unlike conventional versioning systems, the present invention generally allows for conflicting changes to continue even after synchronization. Therefore, as shown after synchronization, the content now includes changes 1 and 3, and changes 2 and 2'.

Changes 2 and 2' may co-exist or continue in the content in various forms. For example, conflicting changes may be highlighted or annotated. In addition, wiki systems 102a and 102b may present conflicting changes in different ways. For example, at wiki system 102a, conflicting changes are presented in the order of 2 then 2', whereas wiki system 102b may present these same changes in the order of 2' then 2. This scheme may be employed, for example, to assist users in readily identifying which wiki system was the source of a change. Of course, other ways of presenting conflicting changes is within the principles of the present invention, such as displaying them side by side.

One skilled in the art will recognize that allowing conflicting changes to continue after a synchronization process is unlike conventional version control systems or typical wiki systems. Typically, version control systems require that all conflicting changes must be resolved before allowing further edits to a particular piece of content. The present invention provides a mechanism to allow for a wide spectrum of changes and allows for conflicting changes to continue so that various users can see them.

FIG. 5 illustrates more of the exemplary lifecycle of shared content between wiki systems 102a and 102b. In particular, at wiki system 102a, an additional change 4 has been made to the content. However, at wiki system 102b, a user or administrator has made manually edited the content to resolve the conflicting changes 2 and 2'. Accordingly, wiki system 102b has transitioned to a new clean version, or new base version.

A new clean or base version of the content may be designated in various ways. For example, the user or administrator making the edits may be prompted to indicate whether their edits result in a new clean version or if they are simply more edits. Alternatively, wiki system 102b may provide a report or notification to an administrator that requests resolution of content having conflicting changes. Upon responding to this report or notification, wiki system 102b may then designate a new clean version into its content database 208.

Subsequently, wiki system 102b may provide the new clean version to wiki system 102a. The new clean version may be appropriately marked as new clean version in the delta encoding provided from version control system 214. Upon recognizing the receipt of a new clean version, wiki system 102a may store it in its content database 208 and will then proceed with using this version as the reference point for changes.

For example, as shown, the new clean version has merged and resolved changes 1, 2, 2', and 3. However, change 4 has not been considered in the new clean version. Accordingly, wiki systems 102a and 102b may exchange change information, which results in a new version that includes change 4. Processing and sharing of content by wiki systems 102a and 102b may then proceed as described above. One skilled in the art will recognize that these processes of sharing content may be modified in various ways.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
   sending, from a first wiki to a second wiki, an indication of desired content to be shared between the first and second wikis;
   receiving, by the first wiki from the second wiki, desired content corresponding to the indication and a relevancy determination corresponding to a threshold fraction of users that tag the desired content to a particular category;
   identifying, by a processor, a first version of the desired content on the first wiki;
   receiving, at the first wiki, a second version of the desired content from the second wiki upon an identification, at the second wiki, of the second version of the desired content; and
   displaying, at the first wiki, the first version of the desired content and the second version of the desired content, wherein the displaying comprises an identification of a source of a change to the desired content.

2. The method of claim 1, further comprising:
   filtering the desired content received from the second wiki based on the particular category.

3. The method of claim 1, further comprising filtering the desired content received from the second wiki based on a second category of content not desired at the first wiki.

4. The method of claim 1, wherein existing content at the first wiki that conflicts with the desired content received from the second wiki is not overwritten.

5. The method of claim 1, wherein the desired content received from the second wiki is different from existing content at the first wiki.

6. The method of claim 1, further comprising receiving, at the first wiki, additional changes made to the desired content on the second wiki.

7. A method, comprising:
   receiving, by a second wiki from a first wiki, an indication of desired content to be shared between the first and second wikis;
   sending, by the second wiki to the first wiki, desired content corresponding to the indication and a relevancy determination corresponding to a threshold fraction of users that tag the desired content to a particular category;
   identifying a second version of the desired content based on the received category;
   sending, from the second wiki to the first wiki, the second version of the desired content;
   identifying, by a processor, changes made to the second version of the desired content on the second wiki, wherein the changes visually indicate differences between a first version of the desired content on the first wiki and the changes made to the second version of the desired content on the second wiki when presented to a user; and
   sending the changes that were identified from the second wiki to the first wiki for display.

8. The method of claim 7, wherein the desired content comprises content absent from the first wiki.

9. The method of claim 7, further comprising filtering the desired content based on a second category of content not desired at the first wiki.

10. The method of claim 7, wherein existing content at the first wiki that conflicts with the desired content sent from the second wiki is not overwritten.

11. The method of claim 7, wherein the desired content sent from the second wiki is different from existing content at the first wiki.

12. The method of claim 7, further comprising receiving, at the second wiki, additional changes made to the desired content on the first wiki.

13. A system comprising:
   a memory comprising instructions; and
   a processor coupled to the memory, the processor to execute the instructions to perform operations comprising:
   sending, from a first wiki to a second wiki, an indication of desired content to be shared between the first and second wikis;
   receiving, by the first wiki from the second wiki, desired content corresponding to the indication and a relevancy determination corresponding to a threshold fraction of users that tag the desired content to a particular category;
   identifying, by a processor, a first version of the desired content on the first wiki;
   receiving, at the first wiki a second version of the desired content from the second wiki upon an identification, at the second wiki, of the second version of the desired content; and
   displaying, at the first wiki, the first version of the desired content and the second version of the desired content, wherein the displaying comprises an identification of a source of a change to the desired content.

14. The system of claim 13, further comprising filtering the desired content received from the second wiki based on a second category of content not desired at the first wiki.

15. The system of claim 13, wherein existing content at the first wiki that conflicts with the desired content received from the second wiki is not overwritten.

16. The system of claim 13, wherein the desired content received from the second wiki is different from existing content at the first wiki.

17. The system of claim 13, further comprising receiving, at the first wiki, additional changes made to the desired content on the second wiki.

18. A non-transitory computer readable storage medium including instructions that, when executed by a processor, cause the processor to:
   send, from a first wiki to a second wiki, an indication of desired content to be shared between the first and second wikis;
   receive, by the first wiki from the second wiki, desired content corresponding to the indication and a relevancy determination corresponding to a threshold fraction of users that tag the desired content to a particular category;
   identify, by the processor, a first version of the desired content on the first wiki;
   receiving, at the first wiki a second version of the desired content from the second wiki upon an identification, at the second wiki, of the second version of the desired content; and
   displaying, at the first wiki, the first version of the desired content and the second version of the desired content, wherein the displaying comprises an identification of a source of a change to the desired content.

19. The non-transitory computer readable storage medium of claim 18, wherein existing content at the first wiki that conflicts with the desired content received from the second wiki is not overwritten.

20. The non-transitory computer readable storage medium of claim 18, further comprising receiving, at the first wiki, additional changes made to the desired content on the second wiki.

* * * * *